United States Patent [19]
Le Bastard et al.

[11] Patent Number: 5,408,516
[45] Date of Patent: Apr. 18, 1995

[54] DEVICE AND METHOD FOR TELEPHONY INTERCONNECTION INTENDED TO OFFER CONTINUITY OF SERVICE TO INDEPENDENT STATIONS IN A COMMUNICATIONS NETWORK

[75] Inventors: Jean Le Bastard, Le Chesnay; Joël Soupirot, La Voulte, both of France

[73] Assignee: Dassault Automatismes Et Telecommunications, Plaisir, France

[21] Appl. No.: 883,454

[22] Filed: May 15, 1992

[51] Int. Cl.6 .................. H04M 11/00; H04Q 7/00
[52] U.S. Cl. ....................... 379/60; 379/58; 379/59; 455/331
[58] Field of Search ............ 379/56, 58, 59, 60, 379/63, 90, 98; 455/33.1, 41, 55.1; 380/9

[56] References Cited

U.S. PATENT DOCUMENTS

| | | | |
|---|---|---|---|
| 4,765,753 | 8/1988 | Schmidt | 379/60 |
| 4,797,947 | 1/1989 | Labedz | 455/33.1 |
| 4,829,554 | 5/1989 | Barnes et al. | 379/58 |
| 4,965,825 | 10/1990 | Harvey et al. | 380/9 |
| 4,972,456 | 11/1990 | Kaczmarek et al. | 379/59 |
| 4,980,907 | 12/1990 | Raith et al. | 379/63 |
| 5,042,082 | 8/1991 | Dahlin | 455/33.1 |
| 5,289,525 | 2/1994 | Isserman et al. | 379/58 |

FOREIGN PATENT DOCUMENTS

| | | |
|---|---|---|
| 0326104 | 8/1989 | European Pat. Off. . |
| 0456547 | 11/1991 | European Pat. Off. . |
| 2234649 | 2/1991 | United Kingdom . |

OTHER PUBLICATIONS

Raith, et al. "Capacity of Digital Cellular TDMA Systems" IEEE Transactions on Vehicular Technology, vol. 40, #2, May 1991.

*Primary Examiner*—Curtis Kuntz
*Assistant Examiner*—William Cumming
*Attorney, Agent, or Firm*—Foley & Lardner

[57] ABSTRACT

In a communications network between fixed stations and fixed terminals, the said fixed stations being linked to the telephony channels while the fixed terminals include an antenna for mutual interaction over distance with independent stations, connection means to the telephony channels of the network are provided, and there is established a telephony relationship between an independent station and another station linked to the telephony channels of the network, by an intermediary of a primary link between the independent station and the connection means, via antennas of a primary fixed terminal. A secondary fixed terminal is chosen on the basis of predetermined selection criteria, and a secondary link is established between the independent station (SA) and the connection means, via an antenna of the secondary fixed terminal. In response to a predetermined station condition, relating to the primary link, a predetermined request information item is generated from the independent station and, in response to reception of the request information item, the said relationship is switched so that it passes through this secondary link.

30 Claims, 7 Drawing Sheets

DEVICE AND METHOD FOR TELEPHONY INTERCONNECTION INTENDED TO OFFER CONTINUITY OF SERVICE TO INDEPENDENT STATIONS IN A COMMUNICATIONS NETWORK

BACKGROUND OF THE INVENTION

1. Field of the Invention

The invention relates to telephony.

It is more particularly intended to serve in a communications network between fixed stations, such as telephone sets, and fixed terminals, the fixed stations being linked to the telephony channels of the network while the fixed terminals include means forming an antenna (more simply called "antenna" in the rest of the text) for mutual interaction over distance with independent stations, such as portable telephone handsets.

2. Related Art

Such a network is, for example, one known by the trademark POINTEL, and the invention finds a particularly advantageous but not limiting application therein.

The POINTEL network does not permit, in its current definition, offering the user of a portable handset continuity of service, when the latter moves, even if all the fixed terminals situated in the vicinity of the user provide complete radio frequency coverage. In fact, currently the telephony communication in progress will be broken off as soon as the user moves out of the radio frequency zone covered by the fixed terminal having initialized the radio frequency link of this telephony communication.

SUMMARY OF THE INVENTION

The invention aims to provide a solution to this problem.

According to a general characteristic of the invention, the telephony device, intended to serve in a communications network of the type quoted above, includes: means for interfacing with the antennae of a plurality of fixed terminals and means for connecting to the telephony channels of the network. The invention also includes specific means, linked to the interface and connection means, suitable for establishing a telephony relationship between an independent station and another station, in principle a fixed telephony set, linked to the telephony channels of the network, by the intermediary of a primary link between the independent station and the connection means, via the antenna of a primary fixed terminal. This specific means is also suitable for establishing at least one secondary link between the independent station and the connection means, via the antenna of a secondary fixed terminal, chosen on the basis of predetermined selection criteria.

According to the invention station-analysis means, incorporated in the independent station, is suitable for generating a predetermined request information item in response to a predetermined station condition relating to the primary link.

The specific means are, moreover, suitable for responding to the reception of this request information item, by switching the telephony relationship so that it passes through this secondary link.

This secondary fixed terminal is advantageously selectable among a chosen group of terminals which are adjacent the primary fixed terminal.

According to an embodiment of the device, the means for interfacing includes, with respectively the antennae of the primary and secondary fixed terminals, first primary and secondary interface stages for a plurality of radio frequency channels. The specific means include primary terminal-processing means. This primary terminal-processing means is linked to the first primary interface stage and is suitable for establishing, within the primary link, a primary radio frequency link between the independent station and the antenna on at least one of the radio frequency channels of this primary fixed terminal, for characterizing this primary radio frequency link one-to-one by a link identifier, and for delivering this link identifier to a second primary interface stage.

The specific means also includes transfer means linked to this second primary interface stage. This transfer means is suitable for receiving the link identifier and for communicating to a second secondary interface stage, situated at the site of the secondary fixed terminal, a link information item containing at least this link identifier.

Also included in the specific means is secondary terminal-processing means, which is linked to the first and second secondary interface stages, and is suitable for establishing, within the secondary link, a secondary radio frequency link between the independent station and the antenna on at least one of the radio frequency channels of this secondary fixed terminal, with the aid of the link identifier.

The request information item then advantageously contains this link identifier.

The selection criteria for the secondary fixed terminal can result from analysis of at least one first characteristic deduced from the primary radio frequency signal transmitted in the course of the primary radio frequency link on at least one of the radio frequency channels of the primary fixed terminal, and from analysis of at least one second characteristic deduced from this primary radio frequency signal.

This first characteristic is, preferably, determination of the level of the primary radio frequency signal in the primary fixed terminal. The second characteristic preferably includes determination of the level of the radio frequency activity resulting from the transmission of the primary radio frequency signal, on the radio frequency channel associated with the secondary fixed terminal, the counterpart of the radio frequency channel associated with the primary fixed terminal, on which the primary radio frequency signal is transmitted.

According to one embodiment of the invention, at least part of the constituent parts of the device can be incorporated in at least one specific module.

It is also possible for these constituent parts to be incorporated within at least some of the connecting units for the fixed terminals belonging to the communications network.

The subject of the invention is also a method for telephony interconnection, intended to serve in a communications network of the type quoted above, in which method there is provided means for connecting to the telephony channels of the network.

According to the method, there is established a telephony relationship between an independent station and another station link to the telephony channels of the network, by the intermediary of a primary link between the independent station and the connecting means, via the antenna of a primary fixed terminal.

A secondary fixed terminal is chosen on the basis of predetermined selection criteria and there is established a secondary link between the independent station and the connection means, via the antenna of the secondary fixed terminal. In response to a predetermined station condition, relating to the primary link, the independent station generates a predetermined request information item, and in response to reception of the request information item, the secondary relationship is switched.

BRIEF DESCRIPTION OF THE DRAWINGS

Other advantages and characteristics of the invention will appear on examining the detailed description below and the attached drawings in which.

The drawings essentially comprise elements of a specific nature. That being so, they can serve not only to make the detailed description below better understood, but also to contribute, if need be, to the definition of the invention.

Detailed Description of the Preferred Embodiments

It is assumed now that the invention applies to the POINTEL network whose structure provided up to the present will now be very briefly described with reference to FIG. 1.

Independent stations 100, such as portable telephone handsets, are capable of mutual interaction over distance with a radio channel with antennae ANT of fixed radio terminals 102.

The radio frequency exchanges between the independent stations and the terminals are governed by a standard of British origin called "CAI" ("Common Air Interface"). The exchanges take place by frequency modulation making use of one frequency band per radio communication.

These fixed terminals 102 are connected to terminal connecting units 104 by a specialized control channel CCS. Each terminal connecting unit thus manages a group of fixed terminals 102.

Figure 1:
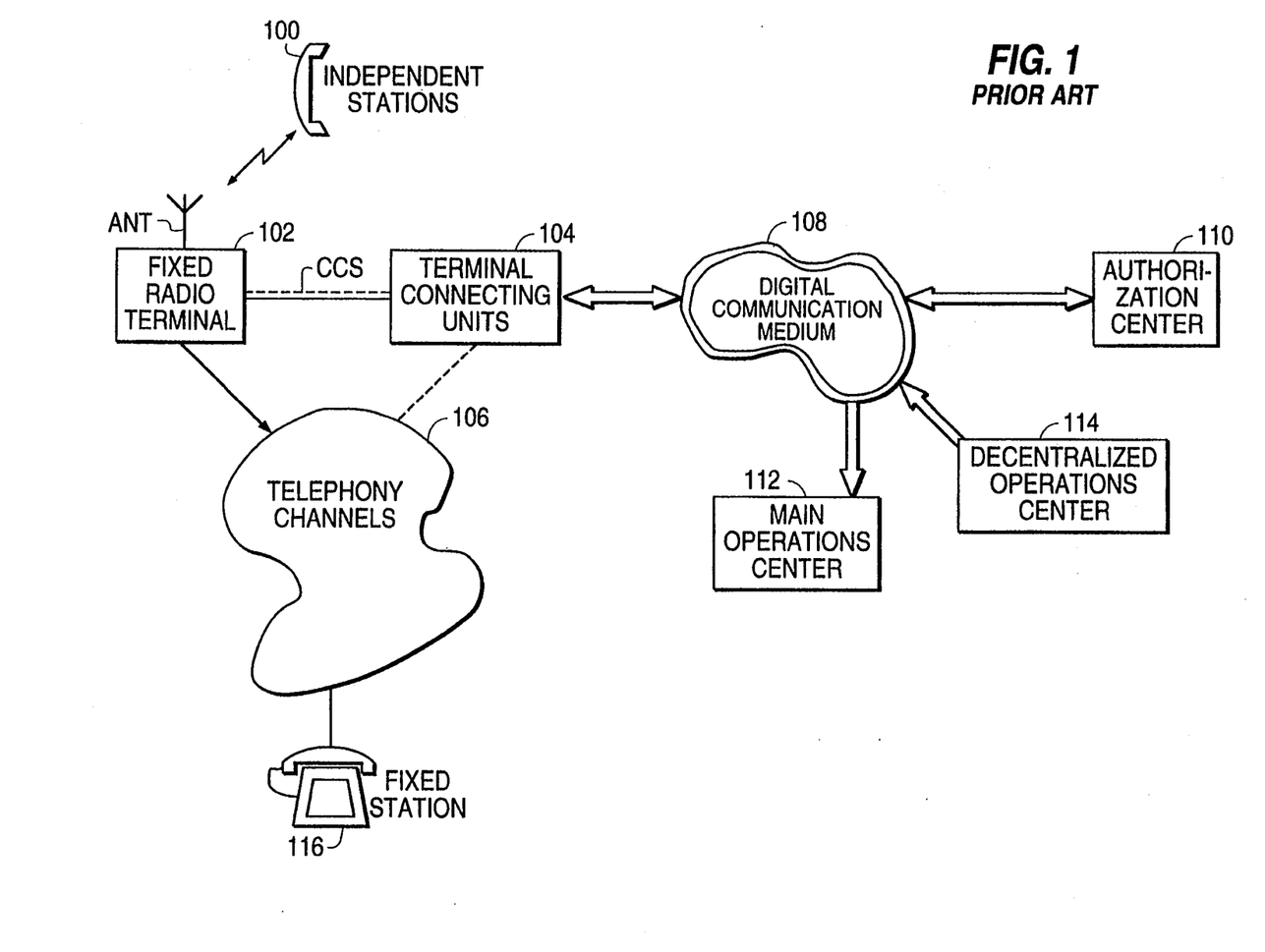
FIG. 1 is a block diagram of communications network of the POINTEL type of the prior art.

As indicated by solid lines in FIG. 1, a fixed terminal can be directly connected to the telephony channels 106 of the public switched telephone networks. In this case the terminal connecting unit 104 which manages it is not connected to these telephony channels.

As indicated by broken lines in FIG. 1, a fixed terminal also might not be directly connected to the telephony channels 106. In this case, its connection is carried out by the intermediary of its connecting unit 104 which is then directly connected to the channels 106.

Each fixed terminal 102 can only send out telephone calls towards the telephony channels 106 but can certainly send out or receive radio calls destined for or originating from independent stations 100.

The communications network includes, in addition to the telephony channels 106, a digital communications medium 108, operating, in principle, by packets, such as the TRANSPAC (registered trademark) network. In the rest of the text, the expression "communications medium" will be replaced by the term "channel" for the sake of uniformity, although the person skilled in the art knows that the significance of the term "channel" may not be the same as in the case of telephony channels.

Onto these digital signal channels 108 are connected the various terminal connecting units 106 as well as other constituent parts of the POINTEL network designated by the references, 112 and 114.

The POINTEL authorization center 110, manages, for the whole of the POINTEL network, especially the subscriptions and thus the authorizations of the POINTEL users to call a fixed station 116 connected to the telephony channels 106, from an independent station. To this end, the terminal connecting units 104 are linked to the authorization center 110 by the digital channels 108.

The terminal connecting units 104 are also linked to the main POINTEL operation center 112, via the digital channels 108, with the aim of transfer of data relating to the telephony communications exchanged so that the center 112 can transmit this data to a billing system.

The decentralized POINTEL operation centers 114 are management installations intended to regionally supervise the operation of the network and especially to detect anomalies in operation of the connecting units 104 and/or the fixed terminals 102.

It should be noted that the decentralized centers 114 can communicate, by the intermediary of the digital channels 108, data to the main centers 112 with the aim of national supervision.

When a telephony communication is exchanged between an independent station 100 and a fixed station 116, a radio frequency link is established between this independent station and the fixed terminal 106 whose radio frequency zone covered by this fixed terminal contains this independent station. Moreover, the fixed terminal 106 can be connected to the public switched telephone network directly, or also by the intermediary of the connecting unit 104 which manages it, according to the connecting configuration of the network adopted.

As already mentioned above, when the user carrying the independent station 100 goes out of the zone covered by the terminal 104 having initialized the radio frequency link, the telephony communication in progress is broken off.

The POINTEL network, in its current definition, as well as the CAI standard, does not then permit offering this user the possibility for radio communication to be automatically relayed through a terminal other than that which initialized this communication.

The main aim of the invention is therefore to remedy this omission.

To this end, generally, there is provided:
 means for interfacing with the antennae of a plurality of fixed terminals,
 means for interfacing with the antennae of a plurality of fixed terminals,
 means for connecting to the telephony channels of the network,
 specific means, linked to the interface and connection means, suitable
  i) for establishing a telephony relationship between an independent station and another station, for example a fixed station, linked to the telephony channels of the network, by the intermediary of a primary link between the independent station and the connection means, via the antenna of a primary fixed terminal, and ii) for establishing at least one secondary link between the independent station and the connection means, via the antenna of a secondary fixed terminal, chosen on the basis of predetermined selection criteria.

There is also provided station-analysis means, incorporated in the independent station, suitable for generating a predetermined request information item relating to the primary link.

The specific means are thus suitable for responding to the reception of the request information item, in principle in the secondary terminal, by switching the telephony relationship so that it passes through this secondary link.

In order to establish the various links, the interface means comprise, with respectively the antennae of the primary and secondary fixed terminals, first primary and secondary interface stages for a plurality of radio frequency channels.

It is thus arranged that the specific means comprise: primary terminal-processing means, linked to the first primary interface stage of the primary fixed terminal, suitable for establishing, within the primary link, in accordance with the CAI standard, a primary radio frequency link between the independent station and the antenna of this fixed terminal, on at least one of these radio frequency channels.

The primary terminal-processing means thus characterize, in accordance with the CAI standard, this primary radio frequency link one-to-one by a link identifier LID1. This link identifier is different from the identifier LID of the POINTEL communications network which has, for example, been sent out by the independent station 100 when the user has wanted to be connected to the POINTEL network with the aim especially of calling another station. It will be seen later that, according to the invention, the request information item contains this link identifier LID1 and that the specific means will use it in order to reestablish telephone communication if the user goes out of the zone of radio coverage of the primary fixed terminal.

After having extracted this link identifier LID1, the primary terminal-processing means deliver it to a second primary interface stage.

The specific means also comprise transfer means, linked to this second primary interface stage, suitable for receiving this link identifier LID1 and for communicating it to a second secondary interface stage, situated at the site of the secondary fixed terminal. In fact, these transfer means are suitable for communicating a link information item INFL containing, in addition to this link identifier, other data elements which will be detailed later.

Finally, secondary terminal-processing means are provided, linked to the first and second secondary interface stages and suitable for establishing, within the secondary link, a secondary radio frequency link between the independent station and the antenna of this secondary fixed terminal on at least one of these radio frequency channels with the aid of the link identifier LID1.

It will be seen later that the first and second primary interface stages, as well as the primary terminal-processing means are advantageously incorporated in the primary fixed terminal while the first and second secondary interface stages, as well as the secondary terminal-processing means, are incorporated in the secondary fixed terminal.

In the same way, the transfer means are preferably incorporated in the connecting unit or units managing the primary and secondary fixed terminals.

It is possible, as will be seen later, for the primary fixed terminal to be connected to a primary connecting unit while the secondary fixed terminal is connected to a separate secondary connecting unit. In this case the transfer means comprise, within the primary connecting unit, primary digital interface means linked to the digital channels of the network and, within the secondary connecting unit, secondary digital interface means linked to these same digital channels. The transfer means then transmit the link information item INFL containing the link identifier LID1, between the primary and secondary connecting units, by the intermediary of the digital channels and the primary and secondary digital interface means.

The primary radio frequency link comprises transmission of a primary radio frequency signal on at least one of the radio frequency channels.

The station condition, in response to which the station-analysis means will send out the request information item (link identifier LID1), thus relates to at least one of the characteristics of this primary radio frequency signal.

In accordance with the CAI standard, the primary radio frequency signal comprises a telephony channel and a signaling channel. The telephony message, supported by the primary radio frequency signal, comprises a specific signaling part (handshake) transported by the signaling channel, as well as a part, called useful, transported by the telephony channel. The specific signaling part makes it possible to check the state of the radio link.

It is then provided that the station-analysis means analyze the presence of this specific part and carry out radio frequency transmission of the link identifier LID1 (request information item) in the absence of this specific part. This absence may result from exiting from the zone of radio coverage of the terminal or even poor radio frequency transmission quality leading to an incomprehensible specific part on the part of the independent station.

In addition to the means already quoted, the specific means comprise first analysis means of at least one first characteristic deduced from this primary radio frequency signal.

This first characteristic can include determination of the level of the primary radio frequency signal at the site of the first primary stage of the primary fixed terminal.

It is also provided that the specific means comprise second analysis means suitable for analyzing, at the site of the first secondary stage, at least one second characteristic deduced from the primary radio frequency signal. The criteria of selection of the secondary fixed terminal can then result from analyses of the first and second analysis means.

The second characteristic is, advantageously, determination of the level of the radio frequency activity on the radio frequency channel of the first secondary stage, the counterpart of the radio frequency channel of the first primary stage on which the primary radio frequency signal is transmitted. This radio frequency activity then results from the transmission of this primary radio frequency signal.

In other words, the secondary terminal or other terminals can perceive radio frequency activity during transmission of the primary radio frequency signal between the independent station and the primary fixed terminal.

The selection criteria for the secondary fixed terminal can also comprise, in a variant, reception of the request information item in this terminal.

It will be seen later that it is possible that the transfer means will communicate the link information item INFL to the secondary fixed terminal, or to all the terminals of the group chosen from terminals adjacent the primary fixed terminal among which the secondary terminal is selectable, before reception of the request information item.

It is also possible, in a variant, that these transfer means will communicate the link information item INFL to the secondary fixed terminal after reception of the request information item.

As far as the connection to the telephony channels of the network is concerned, it is provided that the connecting means comprise:

a first interfaces block linked to the telephony channels of the network,
a second interfaces block linked to some at least of the fixed terminals of the network, and
interconnection means between these interfaces.

The specific means thus comprise specific processing means linked to these interfaces blocks as well as to the interconnection means.

These specific processing means are then suitable for: establishing:

1) a telephony-station link between a first interface of the first interfaces block and the other station, in principle the fixed telephone set,
2) a primary telephony link between a first interface of the second interfaces block and a third primary interface stage of the primary fixed terminal, and
3) a secondary telephony link between a second interface of the second interfaces block and a third secondary interface stage of the secondary fixed terminal, establishing the telephony relationship by authorizing interconnection between the first interface of the first block and the first interface of the second block, then for
authorizing interconnection between the first interface of the first block and the second interface of the second block in order to switch the telephony relationship.

Having now set out the main characteristics of a general nature of the device according to the invention, reference will now be made to FIGS. 2 to 6 in order to illustrate a first configuration of the communications network in which at least one specific module 200 is provided, incorporating at least the first and second interfaces blocks, the interconnection means and the specific processing means.

Figure 2:
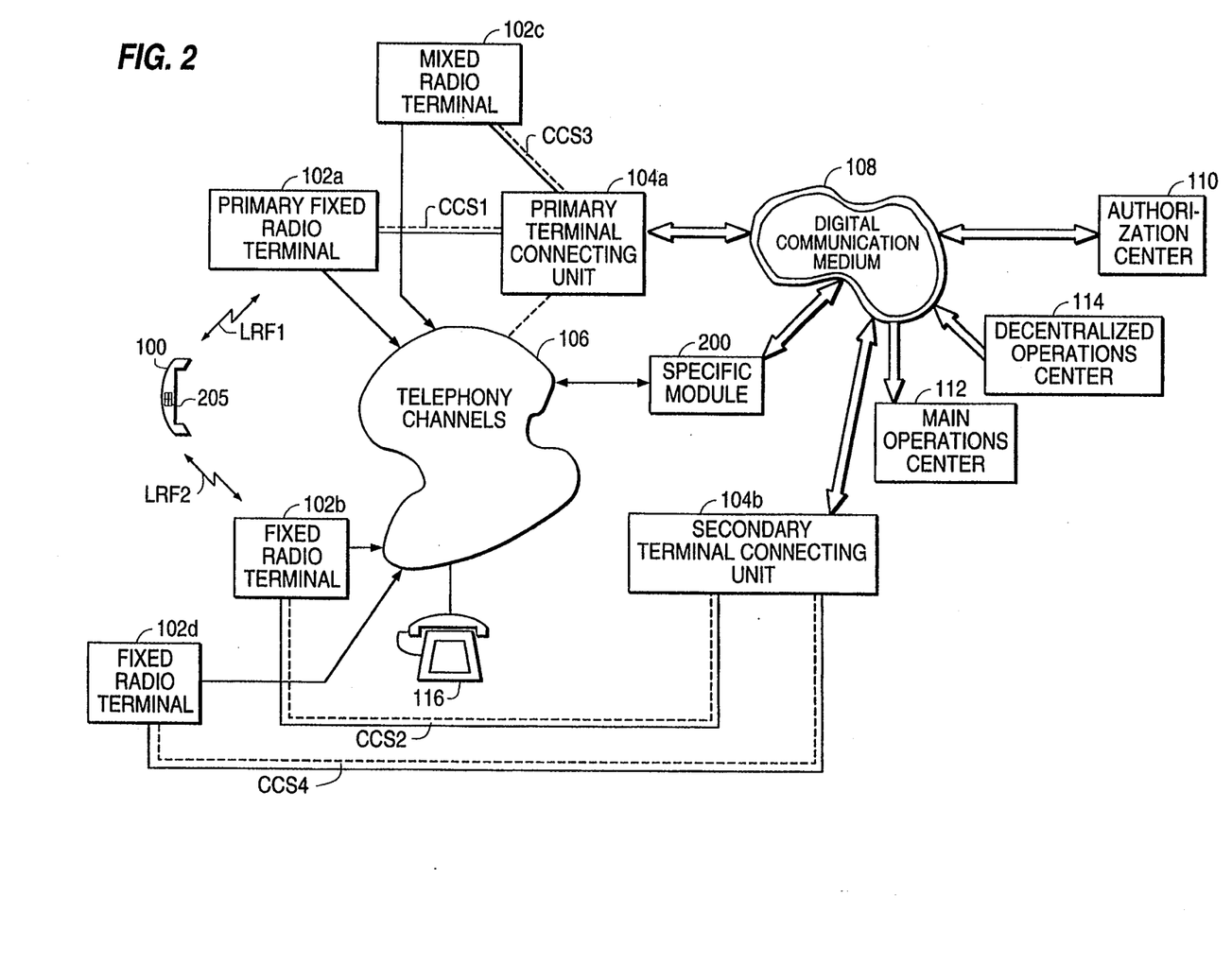
FIG. 2 is a block diagram of a first configuration of a communications network equipped with means according to the invention.

It is provided that the device will comprise a plurality of specific models assigned respectively to separate attachment sectors. FIG. 2 illustrates, for the sake of simplification, a single specific module 200 assigned to an attachment sector.

It will be assumed here that the primary fixed terminal possesses the reference 102a while three fixed terminals adjacent the terminal 102a respectively possess the references 102b, 102c and 102d. The secondary fixed terminal which will be chosen is assumed here to be the terminal BFR2.

It is also assumed that in this configuration the fixed terminals of the network are directly connected to the telephony channels 106 and that a primary connecting unit 104a manages the fixed terminal 102a and 102c via the respective specialized links CCS1 and CCS3 while a secondary terminal connecting unit 104b manages the fixed terminals 102b and 102d via respective specialized links CCS2 and CCS4.

Figure 3:
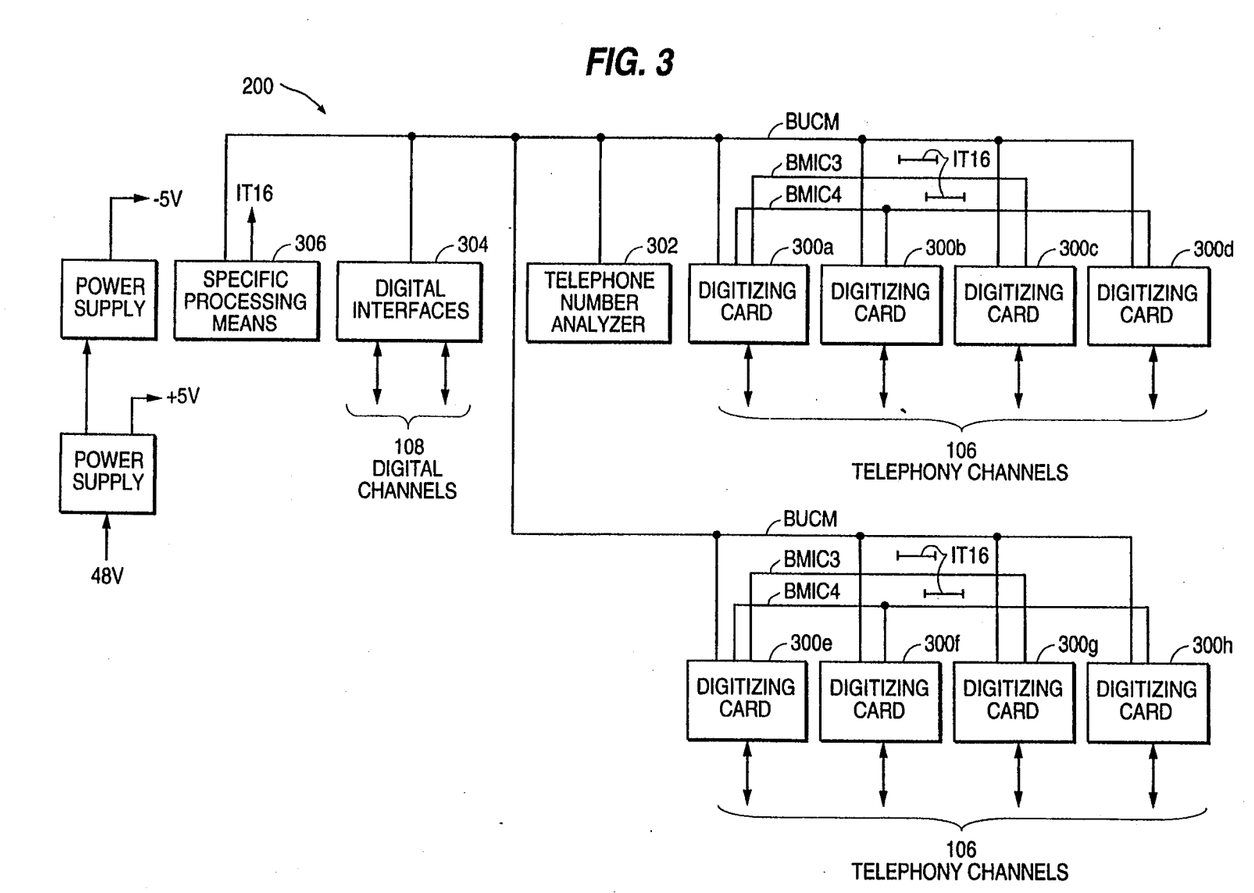
FIG. 3 is a block diagram of a specific module belonging to the device according to the invention.

The first and second interfaces blocks, connected to the telephony channels 106 of the network, comprise a plurality of digitizing cards for the telephony signals, bearing the reference as 300a–300h. These cards are, for example, those marketed by the French company AETA under reference ES0290.

The interconnection means are here represented by two digital linking buses BMIC3 and BMIC4 between the digitizing various cards.

Each bus BMICj has a capacity of two megabits per second.

A card 302 analyzes the telephone numbers received from the telephony channels 106 at the start of communication. The person skilled in the art knows how to produce such a card, for example using decoders (of telephone numbers coded according to the CCITT Q-23 standard) such as those marketed by the British company PLESSEY under reference MV8870DP.

A digital interfaces block 304 is also provided, linked to the digital channels 108. This interfaces block here comprises, for example, a card such as that marketed by the company MOTOROLA under reference MVME333. It is thus possible to produce a digital interface conforming to the international standard CCITT X25.

The specific processing means 306 are linked to the digital interfaces block 304, to the telephone number analyzer 302 and to the digitizing cards 300a–300h by a linking bus BUCM. Physically, the latter can be produced by the card marketed by the MOTOROLA company under reference MVME 117A, based on the MOTOROLA 68010 processor incorporating the software part of these processing means, with which a dynamic random access memory of 2 megabytes is associated.

Each bus BMICj is suitable for transporting digital data formed into a frame subdivided into a plurality of time intervals, typically 32, referenced IT0... IT31. The first time interval IT0 and the seventeenth time interval IT16 are signaling intervals while the other time intervals are used for the various telephony channels.

While the signaling interval IT0 is used for the purposes of synchronization, the signaling interval IT16 is used to attribute a telephone line relating to a call entering or leaving the module 200.

Thus, the specific processing means 306 are suitable for acting on this signaling interval IT16 in order to permit reception or transmission of a telephone call in or from the first and second interface blocks including digitizing cards 300a–300h.

The module 200 finally comprises supply means, for example, first and second power supply means capable of providing voltages of ±5 volts from the voltage of 48 volts delivered by the switched telephone network CTPU.

Figure 4:
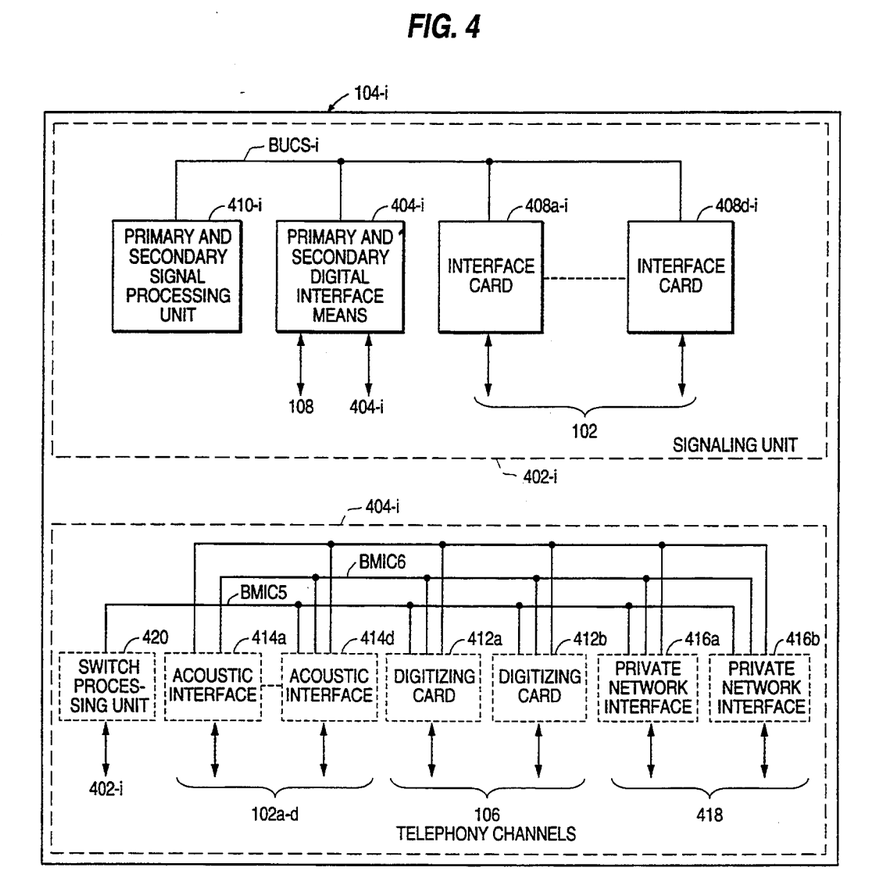
FIGS. 4, 5 and 6 diagrammatically illustrate other means of the device according to the invention.

FIG. 4 is a block diagram of a terminal connecting unit 200-i. The suffix i will be assigned the value 1 when the primary terminal connecting unit 104a is concerned, and the value 2 when the secondary terminal connecting unit 104b is concerned.

The terminal connecting unit 200-i comprises a signaling unit 402-i and a switching unit 404-i as well as power supply means for these two units, not shown here, for reasons of simplification.

The signaling unit 402-i here incorporates transfer means while the switching unit 404-i is not used in this variant and will be described in more detail later.

The transfer means comprise digital interface means 406-i linked to the digital channels 108 of the network as well as to the switching unit 404-i, and which can be produced in a manner similar to the digital interfaces block 304 of the module 200.

These transfer means also comprise a plurality of interface cards 408a-i ... 408d-i producing a signaling interface with the fixed terminals 102. These interface cards can be, for example, those produced from cards marketed by the United States company FORCE COMPUTER INC. under reference SYS68K/ISIO-1/IA, associated with traditional modems.

With these various digital interfaces is associated a signaling processing unit 410-i linked to the cards 406-i and the interface cards by a linking bus BUCS-i. The signaling processing unit 410-i is produced, for example, in a way similar to the specific processing means 306, based on the MOTOROLA processor 68010 which incorporates the software part of the transfer means.

Figure 5:
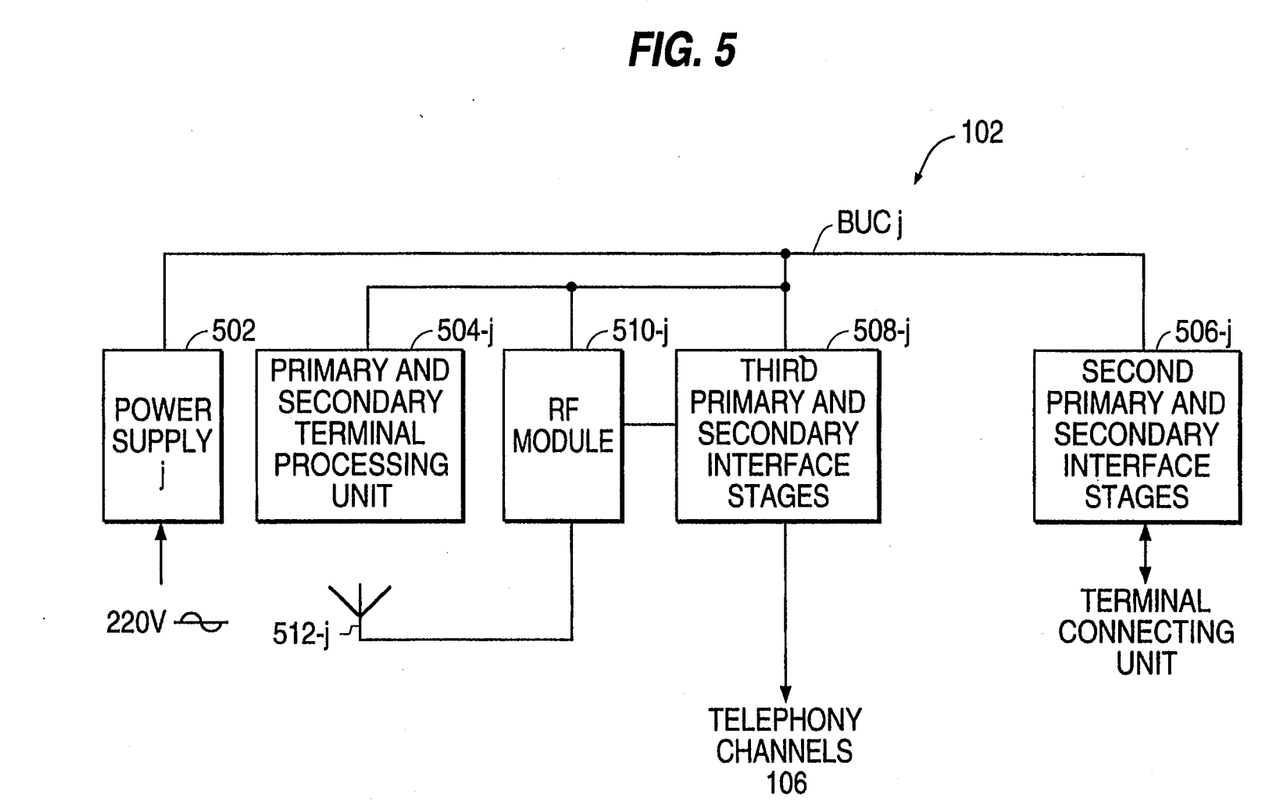
Figure 6:
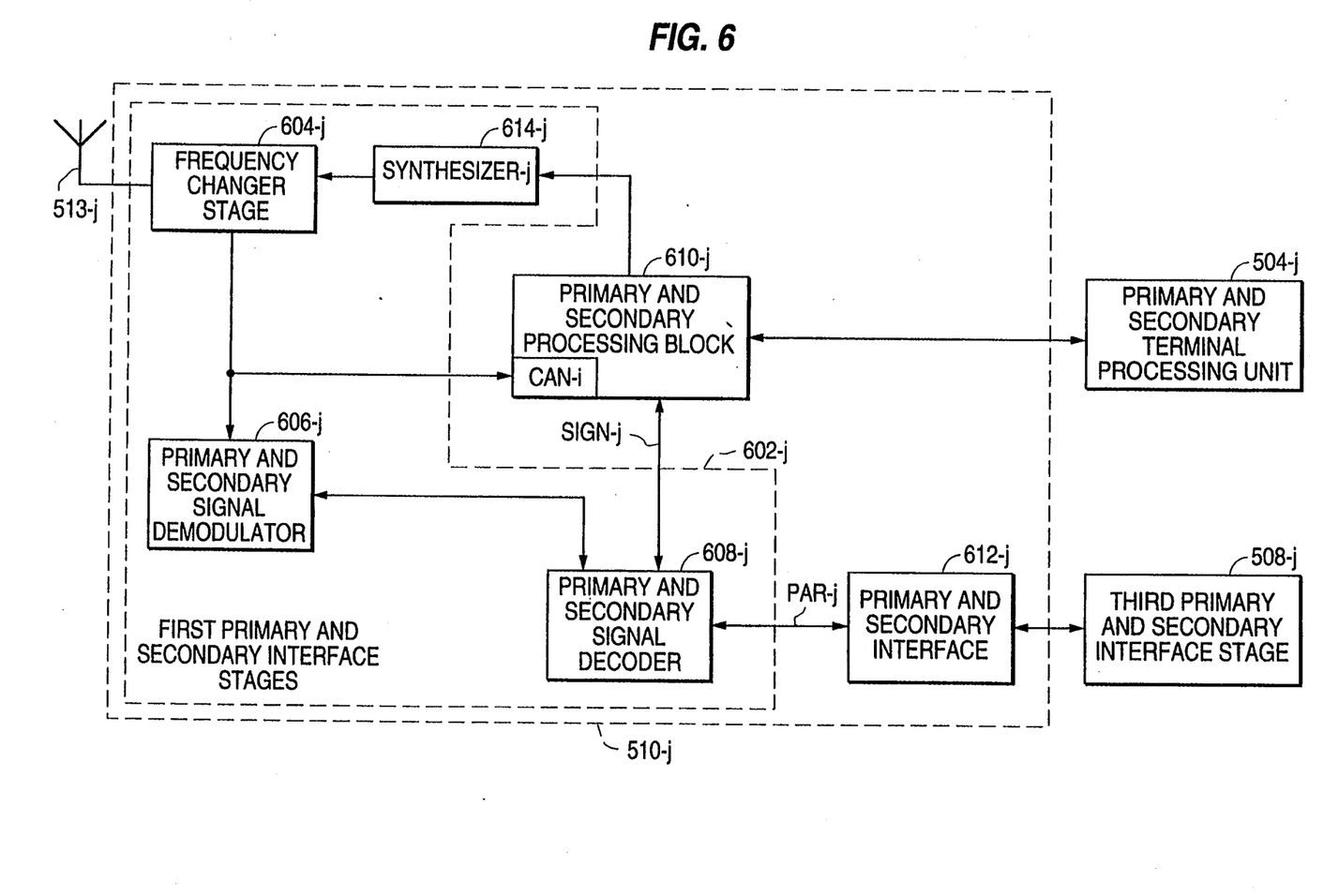

FIGS. 5 and 6 illustrate a block diagram of the composition of a fixed terminal 102.

The structures of fixed terminals 102 of the network are similar. Also, the various constituent parts of this fixed terminal have references allocated the suffix j. This suffix j takes the value 1 when a so-called "primary" element is concerned, that is to say associated with the primary fixed terminal, e.g., 102a , and the value 2 when a so-called "secondary" element is concerned, allocated to the secondary terminal.

In the rest of the text, the adjectives primary and secondary may sometimes be suppressed and understood, for reasons of simplification.

The primary and secondary fixed terminals 102a and 102b, respectively, incorporate primary and secondary terminal-processing means 610-j and 504-j, , i.e., 610-i and 504-i and 610-2 and 504-2, respectively, first primary and secondary interface stages 602-j, e.g., 602-1, 602-2, second primary and secondary interfaces stages 506-j, e.g., 506-1 and 506-2 as well as third primary and secondary interfaces stages 508-j, e.g., 508-1 and 508-2.

A fixed terminal 102 comprises a power supply block 502-j delivering the voltages plus and minus 5 volts from an input voltage of 220 volts AC. A terminal-processing unit 504-j, is also provided, which can be produced in any way similar to the signaling processing unit.

The second interface stage 506-i is, for example, produced from a card similar to that used for the cards 408a–408d. This card makes possible the signaling link interface with the corresponding terminal connecting unit 104a, 104b.

A radio frequency module 510-j is linked to a third interface stage 508-j as well as to the terminal-processing unit 504-j, and to the antenna 512-j of the terminal 102-j.

The card 508-j comprises a module for digital interface with the RF module 510-j, followed by a digital-/analog and analog/digital converter block produced, for example, on the basis of components such as those marketed by the company SGS-THOMSON under reference ETC 5067. This converter block is itself followed by a model for analog subscriber line interface with the telephony channels 106 in accordance with the specifications for connection to the switched telephone network.

Finally, a link bus BUC-j makes it possible to link the various components of this network together.

As illustrated in FIG. 6, the module 510-j comprises a frequency changer stage 604 linked to the antenna 512-j , followed by a signal demodulation circuit 606-j then by a signal decoder circuit 608-j.

This decoder 608-j is suitable for discriminating on the one hand the signaling signals communicated by a link SIGN-j to a processing block 610-j, and word signals communicated by another link PAR-j to a block 612-j forming the interface with the card 508-j.

The processing block 610-j is linked to the terminal-processing unit 504-j, as well as to a synthesizer 614-j connected, moreover, to the frequency changer stage 604-j for selection of the radio frequency channel on which the radio frequency link is established.

Such a module 510-j is, for example, that currently available from the Applicant under reference DTRF GPT-FT equipment.

It can be considered, functionally, that the first interface stage 602-j, encompasses the two frequency changer stages, the demodulation and decoding circuits for the signals as well as the synthesizer.

The terminal-processing means as well as the first and second analysis means comprise software modules incorporated within the terminal-processing unit blocks 504-j, and the processing blocks 610-j.

We will now consider the case of a telephony communication established from the independent station 100 with the fixed station 116.

When the user is connected to the POINTEL network, by using the keypad of his handset, the station-analysis means communicate, for the attention of the primary fixed terminal 102a, the identifier LID of the POINTEL network, as well as the identifier PID of the portable handset. The telephone call coming from the portable handset of independent station 100 can be taken into account by the primary fixed terminal 102a since the primary terminal-processing means of the latter already know the identifier LID of the POINTEL network. The telephone number of the called station, also composed on the keypad of the handset, as well as the identifier PID of this portable handset are transmitted by the intermediary of the primary connecting unit 104a and digital channels of the network to the POINTEL authorization center 110 for checking.

When this checking is carried out, the transfer means of the primary connecting unit 104a establish a digital link with the specific module 200 by the intermediary of the digital channels of the network. This digital link has the aim of requesting from the specific processing means of the module 200 a call number of this specific module 200 by the intermediary of the switched telephone network 106. This telephony call number is referenced ABPQMCDU.

This call number ABPQMCDU is associated one-to-one with the identifier PID of the independent station and is communicated to the primary terminal connecting unit 104a, returning via the digital channels of the network.

The transfer means of the primary terminal connecting unit 104a then communicate via the signaling line of the specialized link CCS1 the call number ABPQM-CDU as well as the authorization from the POINTEL authorization center 110, to the primary terminal-processing means 504-1 of the terminal 102a.

The primary radio frequency link is thus maintained between the portable handset 100 and this fixed terminal 116 and is characterized as discussed above by the link identifier LID1, associated one-to-one with this link, and differing from the network identifier LID.

The primary terminal-processing means 504-1 then communicate to the primary terminal connecting unit 104a this link identifier LID1. The transfer means of this primary terminal connecting unit 104a then broadcast, by the intermediary of these digital channels 108 of the network and the specialized links to all the terminals 102b, 102c, 102d adjacent the terminal 102a, a link identifier INFL, containing the identifier LID1, as well as the call number ABPQMCDU of the specific module and the identifier of the independent handset PID.

Let us now return to the establishment of the primary link between the primary fixed terminal 102a and the fixed station 100.

The primary terminal-processing means 504-1 call the specific module 200 by the intermediary of the switched telephone network 106, with the aid of the call number ABPQMCDU. In fact, only the MCDU part of this call number is analyzed and used by the specific module 200.

This "half-call" from the fixed terminal 102a to the specific module 200 is received in the first interface of the second interfaces block of this module and will contribute to the establishment of the said primary telephone link.

The specific processing means 306 of the module 200 then allocate, by the intermediary of the bus BMIC-j, the first interface of the first interfaces block so as to reserve a telephone line for the second "half-call" from the specific 200 to the station 100, which will contribute to the establishment of the said telephony-station link.

When this allocation is carried out, the switched telephone network sends, by the intermediary of the specific processing means 306 of the module 200, a call tone to the primary terminal-processing means of the primary fixed terminal 102a and bring about interconnection between the first interfaces of the first and second interfaces blocks of the connection means.

The primary terminal-processing means then dial the telephone number of the called station 116 which will have the consequence of putting the station 100 in communication with this station 116.

In the course of the telephony communication, when, for example, the user moves and exits the zone of radio coverage of the terminal 102a, or else if there is any radio interference, the station-processing means of the handset will detect the lowering in level of the primary radio frequency signal, especially when the latter no longer receives the specific part of the telephony message (thus the said predetermined station condition is present here).

In this case, the station-processing means 205 will broadcast, on the various radio channels, the request information item, that is to say the link identifier LID1.

All the fixed terminals 102b, 102c, 102d, adjacent the primary fixed terminal 102a, are able to recognize the link identifier LID1, since their respective terminal-processing means have had foreknowledge of it.

It will be assumed, now that the user has approached terminal 102b, that it is this latter terminal which receives the identifier LID1 and which is therefore chosen among the group of adjacent terminals to be the secondary fixed terminal.

On reception of this link identifier LID1, the secondary terminal-processing means of the secondary fixed terminal are suitable for sending a secondary call signal to the second interface of the second block, with the aid of the call number ABPQMCDU of the specific module, which will contribute to the establishment of the secondary telephony link. In practice, only the part MCDU of this call number is transmitted by the switched telephone network 106 to the specific module 200.

On reception of this secondary call signal at the second interface of the second interfaces block of the specific module 200, the specific processing means cause the interconnection between the first interface of the first interfaces block and this second interface. The telephony relationship between the independent station 100 and the fixed station 116 is thus switched and the user is offered continuity of service.

In order to prevent untimely switching between two primary terminals, and in order to possibly leave time for the primary fixed terminal 102a to pick up an interrupted radio frequency link again, especially in the case where an independent handset finds itself equidistant from two fixed terminals, it is preferable for the secondary terminal-processing means of the secondary fixed terminal 102b only to transmit the secondary call signal after a predetermined time delay typically of the order of 3 seconds, starting on first reception of the link identifier LID1 at the first secondary stage of this secondary fixed terminal 102b. It will be recalled, in fact, that the station-processing means are able to send out the link identifier at regular intervals until the latter is received by one of the fixed terminals.

We will now consider the case where the fixed station 116 wishes to establish telephony communication with the independent station 100.

In order that the independent handset 100 can be called, at no matter what geographical location, it is appropriate that it can be located with respect to a chosen fixed terminal. This location information is stored in means forming a data base BDP (not shown) associated with each specific module 200 and contained, for example, in the 2 megabytes dynamic-random-access memory of the MOTOROLA 68010 processor. This data base BDP comprises, in addition to the location information of the chosen fixed terminal, here terminal 102a, and therefore of the independent station 100, the correspondence between the call number of this handset 100 and its physical identifier PID.

This location information results from a locating dialogue between the independent handset 100 and the chosen terminal 102a.

Preferably, the principle of voluntary location on behalf of a subscriber wishing to receive telephone calls on his independent handset is contemplated. It is assumed that this is the case here for the user carrying this independent station 100. This wish is recorded in the database BDP associated with the specific module 200. It is also possible to associate with this wish a maximum duration during which the subscriber effectively wishes to receive telephone calls. A callable independent station will thus be equipped with means suitable for signifying refusal or acceptance to receive telephone calls. Such an autonomous station can thus effectively display its intention to receive calls.

The locating dialog can then in this case be the sending of a locating signal by this handset from the independent station 100 to the chosen fixed terminal 102a. This can also be a telephony communication (incoming or outgoing) between this handset and this chosen terminal.

In practice, the database BDP stores, corresponding with the call number of the independent handset, the digital identification (for example, the address), on the digital channels, of the connecting unit of terminals 104a having carried out the last location on the basis of a location signal sent out by the handset, as well as a designation, for example, the number, of the chosen fixed terminal 102a where this last location took place. Each data base BDP (here associated with a specific module 200) possesses an address making it possible to contact it on the digital channels 108.

In response to a telephone call request from a calling fixed station 116 on the switched telephone network 106, the specific processing means 306 of the module 200 will establish a control link with the chosen fixed terminal.

This control link comprises, after consultation of the corresponding data base BDP, a digital link between the specific module 200 and the terminal connecting unit 104a whose address corresponds to the location information item. More precisely, establishment of this control link comprises sending a digital signal from the specific module 200 to the chosen terminal 102a by the intermediary of its connecting unit 104a. This digital signal comprises, in addition to identification of the terminal 102a, an instruction for a radio call by this terminal 102a to the independent station 100, as well as the telephone number ABPQMCDU for a call by this terminal 102a to the specific module 200.

This telephone call from the terminal 102a to the specific processing means 306 of the module 200 is subject to the satisfaction of additional predetermined conditions.

A first additional predetermined condition can be checking the effective capacity of the fixed terminal 102a to interact with the handset. This checking can include, for example, monitoring the correct operation of this terminal or even its capacity to reach the independent handset 100 by radio waves.

Another additional predetermined condition may also be checking the effective presence of the subscriber ready to accept the telephone call.

Moreover, the telephony-station link has been established between the fixed station 116 and the first interface of the first interfaces block of the module 200.

When the terminal 102a has called the module 200 for establishment of the said primary telephony link, this call being received at the first interface of the second interfaces block, the specific processing means cause interconnection of these two interfaces in order to establish the telephony relationship.

As before, in parallel with this establishment, the transfer means communicate to the terminals 102b, 102c, 102d adjacent the terminal 102a the link identifier LID1 as well as the call number ABPQMCDU of the module 200 so that this telephony relationship can possibly be switched by passing through a terminal adjacent the terminal 102a.

It is appropriate also to note that, when the interconnection is effectively set up within the specific module 200, the primary and possibly secondary telephony links between the independent station and the specific module are recorded as being charged to the subscriber holding the independent handset in order to bill him as a consequence. The telephony-station link established between the fixed station and the module 200 is recorded as being charged to the fixed station with a view to billing it.

In the case of a telephone call coming from the independent station to the fixed station all the telephony links established are charged to the caller.

Figure 7:
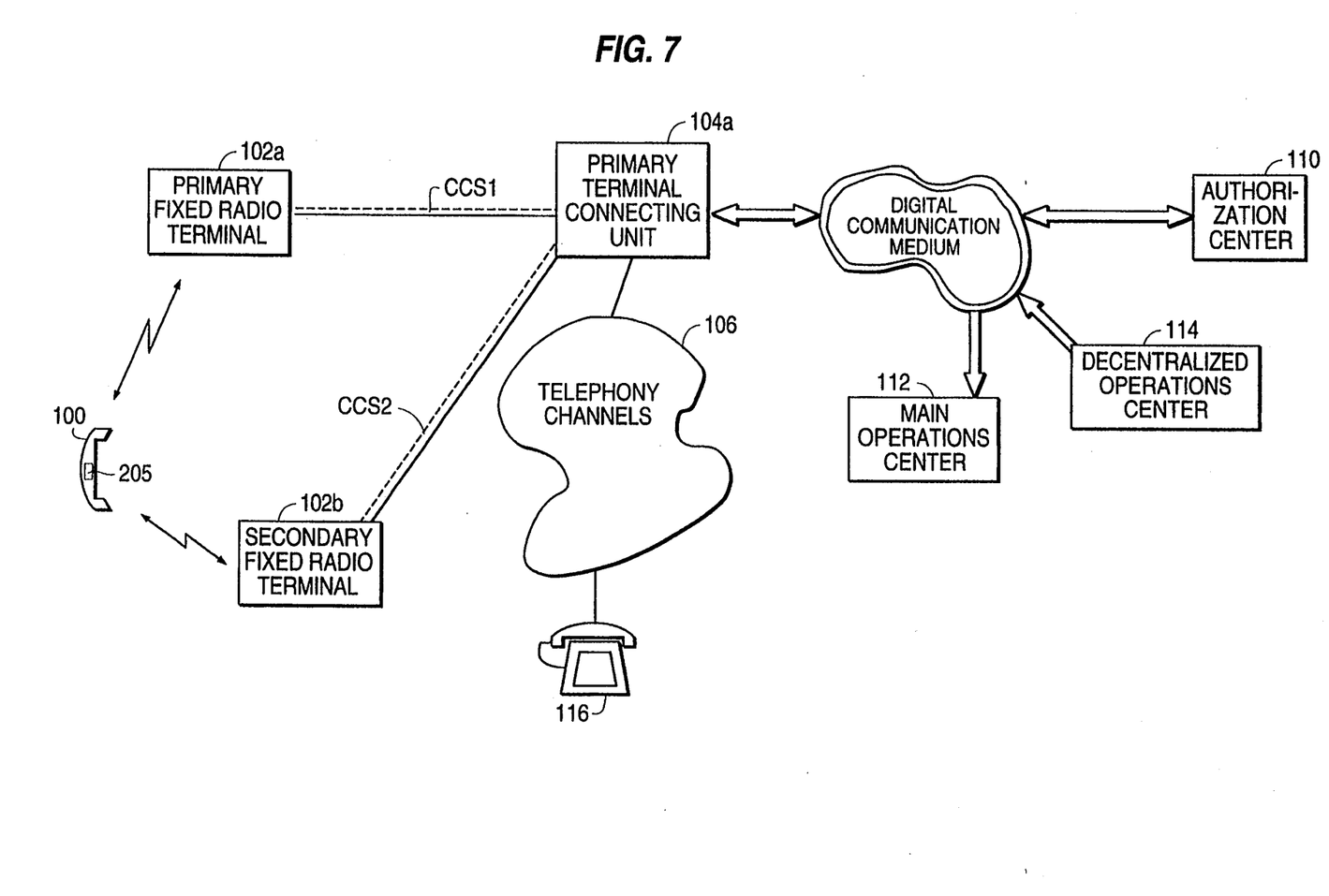
FIG. 7 illustrates a second configuration of a communications network equipped with means according to the invention.

We will refer now to FIG. 7 which illustrates a second configuration of the network in which specific modules 200 are not provided. In contrast, the first and second interfaces blocks, the interconnection means and the specific processing means are incorporated into at least some of the connecting units 104 of the network, in practice into all the connecting units. The other means of the device according to the invention remain, in this variant, installed as described above.

We also assume here that the fixed terminals are not directly connected to the telephony channels of the network CTPU but by the intermediary of their respective connecting unit.

For the sake of simplicity in the description it will also be assumed here that the primary and secondary fixed terminals 102a and 102b are both connected by respective specialized links CCS1 and CCS2 to the connecting unit 104a.

If we return now to FIG. 4, it will be noted that the switching unit 404-j of the connecting unit 104-j (here 104a,) comprises, in addition to the plurality of digitizing cards 412, e.g., 412a, 412b for digitizing the telephony signals, forming the first interfaces block, a plurality of specialized acoustic interfaces cards 414, e.g., 414a . . . 414d suitable for being connected to the primary and secondary fixed terminals via the specialized links CCS1 and CCS2.

These cards 414, e.g., 414a . . . 414d, comprise an interface with linking buses BMIC5 and BMIC6, followed by a converter block similar to that used in the card 508-j, followed in turn by a telephony interface (limited to the acoustic part) on a specialized link with the terminals.

The first interfaces block also comprises a plurality of cards 416, e.g., interface for connecting to telephony channels 418 of a private communications network.

These cards exhibit a structure similar to the cards 414, the telephony interface over a specialized link being replaced by an analog subscriber line interface with the channels 418 in accordance with the specifications for connection to the switched telephone network.

All of these cards are linked together by lining buses BMIC5 and BMIC6 as well as to a switching processing unit 420-i linked to the signaling processing unit 410-i. This switching processing unit is, for example, produced with the aid of the MVME 117A card (already quoted), incorporating one of the software parts of the specific processing means.

When, it the case of a telephony communication established from the independent station 100 to the fixed station 116, the user dials the telephone number of this fixed station, on the keypad of his handset 100, the checking procedure is carried out in liaison with the authorization center 110, in a similar way to that described above.

When authorization is granted by the authorization center 110, the primary radio frequency link is maintained between the portable handset 100 and the fixed terminal and is characterized in a way similar to that quoted above by the link identifier LID1.

The specific processing means of the connecting unit 104a then allocate, by the intermediary of the buses BM1C, the first interface of the first interfaces block so as to reserve a telephone line for the half-call from the connecting unit to the station 116, so as to contribute to the establishment of the said telephony-station link.

In parallel, the specific processing means allocate, by the intermediary of the cards 414, the fist interface of the second interfaces block contributing to the establishment of the primary telephony link.

When these allocations are carried out, the specific processing means transmit, by the intermediary of a card 408 and of the signaling path of the specialized link CCS1, a call tone sent out by the channels 106, to the primary terminal-processing means of the terminal 102a, and cause interconnection between the first interfaces of the first and second interfaces blocks.

The primary terminal-processing means then dial the telephone number of the called station 116, which will have the consequence of putting the station 100 in communication with the station 116.

In the course of the telephony communication, the first and second analysis means, here formed by software modules incorporate within the terminal connecting unit 104a, analyze respectively the level of the primary radio frequency signal exchanged between the independent set and the first interface stage of the primary terminal 102a, and the level of the radio frequency activity, resulting from the transmission of the primary radio frequency signal, on the radio frequency channels of the neighboring terminals, the counterparts of the radio frequency channel of the first primary stage on which the said primary radio frequency signal is transmitted.

Needless to say that assumes that at least one of the neighboring terminals is not saturated, that is to say that all its radio channels are not already used for other radio frequency links with other independent stations.

When the level of the primary radio signal crosses a predetermined threshold, for example, becomes less than −80 dBm, and when, in parallel, the level of the radio frequency activity on one of the neighboring terminals becomes greater than another predetermined threshold, for example, of the order of −60 dBm, this terminal (assumed to be the terminal 102b) will be selected in order to switch the telephony relationship in progress.

In order to do that, the transfer means will then communicate to this terminal 102b the link identifier LID1. The specific processing means will then allocate, by the intermediary of a card 414, an acoustic link between this terminal 102b and the terminal connecting unit 104a.

On reception of the link identifier LID1 sent out by the independent station, a channel will be selected on which the secondary radio frequency link will be established, and the specific processing means will break off the acoustic link between the first interface of the second interfaces block (at the site of a card 414) and the primary terminal 102a, then will carry out interconnection between the second interface of this second interfaces block and the first interfaces of the first interfaces block produced at the fixed station 116.

In order to avoid the terminal 102a taking up the radio link again (since it also receives the identifier LID1 sent out by the portable handset) so as to immediately generate a new switch to terminal 102b, a signal can be sent to a terminal 102a forbidding it to recognize the identifier LID1. Thus, only terminal 102b will be able to pick up the radio link.

For the user, switching this telephony relationship is perceived as reestablishment of the radio link. It will also be noted that the outgoing path is, on the contrary, not changed. There is thus no break in the telephony-station link to the fixed station 116.

It has been assumed here that the link identifier LID1 was communicated to the secondary fixed terminal 102b after the analysis carried out by the first and second analysis means. It could also be envisaged that, in parallel with the establishment of the primary link passing through the primary fixed terminal 102a, the terminal connecting unit 104a is already broadcasting the link identifier LID1 to the other neighboring terminals, that is to say before choosing a secondary fixed terminal.

The invention also permits ensuring continuity of service, not only when the user moves, but also when the external environment disturbs the radio link with the terminal, by choosing another less "disturbed" terminal, and to do this on the initiative of the independent station.

The invention is not limited to the embodiments described above but embraces all the variants contained in the scope of the claims below, especially the following:

the two embodiments described, based on specific modules and without specific modules, are not incompatible. In this context a network configuration could be envisaged in which some geographical sectors might be equipped with specific modules and other geographical sections would contain the specific means incorporated in the terminal connector units;

the specific module 200, or even a connecting unit 104, could equally be connected to a private communications network also containing private telephony channels and private digital channels;

it is also not excluded that the use could be envisaged, in the second variant described, of the type of predetermined conditions and/or selection criteria used in the first variant, and conversely;

it is also possible to include, within the specific module 200 or a connecting unit 104, a card making it possible to send out recorded standby messages to the calling users. This card could be equipped with voice synthesis generators associated with memories.

Telephone calls originating from a calling independent station to a callable independent station could also be envisaged. In this case, one of the fixed terminals interacting with one of the independent calling or called stations plays the role of the fixed station 116 described above.

More generally, an independent station is not limited to a telephony handset but relates to any object capable of interacting with a fixed terminal.

Needless to say, some of the means described above can be omitted in the variants where they have no function.

We claim:

1. A telephony device for use in a communications network between fixed stations and fixed terminals, the fixed stations being linked to telephony channels, the fixed terminals each having an antenna for mutual interaction over distance with independent stations, the telephony device comprising:

means for interfacing with the antennae of a plurality of the fixed terminals, means for connecting to the telephony channels, specific means, linked to the means for interfacing and means for connecting, for establishing a telephony relationship between at least one of the independent stations and a fixed station linked to the telephony channels through a primary link between the independent station and the means for connecting, via the antenna of a primary one of the fixed terminals, and for establishing at least one secondary link between the at least one of the independent stations and the connecting means, via the antenna of a secondary using fixed terminal selected from among the fixed terminals using predetermined selection criteria, station-analysis means, incorporated in the independent station, for generating a predetermined request information item in response to a predetermined station condition of the primary link, wherein the specific means responds to reception of the request information item, by switching the telephony relationship to pass through the secondary link, wherein the means for interfacing comprise, with respectively the antennae of the primary and secondary fixed terminals, first primary and secondary interface stages for a plurality of radio frequency channels, and wherein the specific means comprise:

primary terminal-processing means, linked to the first primary interface stage for establishing, within the primary link, a primary radio frequency link between the independent station and the antenna on at least one of the radio frequency channels of the primary fixed terminal, for associating the primary radio frequency link one-to-one with a link identifier, and for delivering the link identifier to a second primary interface stage, transfer means linked to the second primary interface stage for receiving the link identifier and for communicating to a second secondary interface stage a link information item containing at least the link identifier, and secondary terminal-processing means, linked to the said first and second secondary interface stages, for establishing, within the secondary link, a secondary radio frequency link between the independent station and an antenna on at least one of the radio frequency channels of the secondary fixed terminal, using the link identifier.

2. The device as claimed in claim 1, wherein the secondary fixed terminal is selectable among a chosen group of terminals which are adjacent to the primary fixed terminal.

3. The device as claimed in claim 1, wherein the request information item contains the link identifier.

4. The device as claimed in claim 1, wherein the first and second primary interface stages, as well as the primary terminal-processing means are incorporated into the primary fixed terminal, and the first and second secondary interface stages, as well as the secondary terminal-processing means are incorporated into the secondary terminal.

5. The device as claimed in claim 1, comprising connecting units for fixed terminals linked to groups of the fixed terminals and together, wherein, the primary and secondary fixed terminals are linked to at least one of the connecting units, the transfer means being incorporated into the connecting units.

6. The device as claimed in claim 5, wherein the network comprises a digital communications medium the primary fixed terminal being linked to a primary connecting unit and the secondary fixed terminal being linked to a secondary connecting unit, wherein the transfer means comprise, within the primary connecting unit, primary digital interface means linked to the digital communications medium, and, within the secondary connecting unit, secondary digital interface means linked to the digital communications medium, wherein the transfer means transmit the link information item, between the primary and secondary connecting units, through the digital communications medium and the primary and secondary digital interface means.

7. The device as claimed in claim 1, the transfer means communicating the link information item to the said secondary fixed terminal before reception of the said predetermined condition.

8. The device as claimed in claim 7, the transfer means communicating the link information item to all the terminals of a group before reception of the predetermined request information item.

9. The device as claimed in claim 1, wherein the transfer means communicate the link information item to the secondary fixed terminal after reception of the predetermined request information item.

10. The device as claimed in claim 1, wherein the interface means comprise a first primary interface stage with the antenna of the primary fixed terminal for a plurality of radio frequency channels, wherein the specific means comprise:

primary terminal-processing means, linked to the first primary interface stage for establishing, within the primary link, a primary radio frequency link between the independent station and the antenna on at least one of the radio frequency channels of the primary fixed terminal, the primary radio frequency link comprising transmission of a primary radio frequency signal on at least one of the radio frequency channels, the said predetermined station condition relating to at least one of the characteristics of the primary radio frequency signal.

11. The device as claimed in claim 10, wherein the station-analysis means incorporated in the independent station analizes the presence of a specific part of a telephony message transported by the primary radio frequency signal, and effects radio frequency transmission of the request information item in the absence of the specific part.

12. The device as claimed in claim 1, wherein selection criteria for the secondary fixed terminal comprise reception at the secondary fixed terminal of the said request information item.

13. The device as claimed in claim 1, wherein the interface means comprise, with respectively the antennae of the primary and secondary fixed terminals, first primary and secondary interface stages for a plurality of radio frequency channels, wherein the specific means comprise:

primary terminal-processing means, linked to the first primary interface stage, for establishing, within the primary link, a primary radio frequency link between the at least one independent station and the antenna on at least one of the radio frequency channels of the primary fixed terminal, the primary radio frequency link comprising transmission of a primary radio frequency signal on at least one of the radio frequency signal on at least one of the radio frequency channels, first analysis means including a primary processing block and a primary signal decoder for analyzing, at the level of the first primary stage, at least one first characteristic deduced from the primary radio frequency signal, and second analysis means including a secondary processing block and a secondary signal decoder for analyzing, at the level of the first secondary stage, at least one second characteristic deduced from the primary radio frequency signal, and the selection criteria for the secondary fixed terminal resulting from the analyses.

14. The device as claimed in claim 13, wherein the first characteristic comprises a level of the primary radio frequency signal while and the second characteristic comprises radio frequency activity, resulting from transmission of the primary radio frequency signal, on the radio frequency channel of the said first secondary stage, being a counterpart of the radio frequency channel of the first primary stage on which the primary radio frequency signal is transmitted.

15. The device as claimed in claim 1, wherein at least the primary and secondary fixed terminals comprise respectively third primary and secondary interface stages linked respectively to the primary and secondary terminal-processing means, wherein the connecting means comprise:
a first interfaces block linked to the telephony channels,
a second interfaces block linked to at least of the fixed terminals,
interconnection means the first and second interfaces blocks,
wherein the specific means comprise specific processing means linked to the interface blocks as well as to the interconnection means,
the specific means: establishing a telephony—station link between a first interface of the first interfaces block and the another of the stations, a primary telephony link between a third primary interface stage of the primary terminal and a first interface of the second interfaces block, and a secondary telephony link between a third secondary interface stage of the secondary terminal and a second interface of the second interfaces block,
establishing the telephony relationship by authorizing an interconnection between the first interface of the first interfaces block and the first interface of the second interfaces block, and
authorizing an interconnection between the first interface of the first interfaces block and the second interface of the second interfaces block in order to switch the telephony relationship.

16. The device as claimed in claim 15, wherein, while the telephony relationship from the independent station to the another of the stations is established:

establishment of the primary telephony link results from a primary call signal from the third primary interface stage of the primary terminal to the second interfaces block, the specific processing means allocating, in response to the primary call signal, the first interface of the first interfaces block, carrying out interconnection between the first interface of the first interfaces block and the first interface of the second block and transmitting a dialling authorization signal to the primary fixed terminal so that the primary fixed terminal composes the telephone number of the another of the stations.

17. The device as claimed in claim 16, wherein the third primary and secondary interface stages interface stages are linked to the telephony channels while the second interfaces block is connected to the telephony channels.

18. The device as claimed in claim 15, the secondary terminal-processing means, incorporated in the secondary fixed terminal, are sending a secondary call signal in the second interface of the second interfaces block, after reception of the link identifier in the first secondary stage.

19. The device as claimed in claim 18, wherein, as the station-analysis means transmit at least once the said link identifier, the primary terminal-processing means sends the secondary call signal after a predetermined time interval starting on first reception of the link identifier in the first secondary stage.

20. The device as claimed in claim 13 and, wherein in the presence of a primary radio frequency signal exceeding a predetermined primary threshold, and in the presence of a level of radio frequency activity exceeding a predetermined secondary threshold, the specific processing means transmits to the secondary terminal-processing means a control information item thereby permitting establishment of the secondary radio frequency link.

21. The device as claimed in claim 15, comprising a specific module incorporating at least the first and second interfaces blocks, the interconnection means and the specific processing means.

22. The device as claimed in claim 1, comprising a digital communications medium, and a specific module comprising a digital interfaces block linked to the digital communications medium, and the transfer means communicating the link information item to the module through the digital communications medium.

23. The device as claimed in claim 21, wherein the link information item comprises, in addition to the link identifier, a station identifier identifying the independent station as well as a telephone call number of the specific module for receipt in the first interfaces block of the specific module.

24. The device as claimed in claim 23, the secondary terminal-processing means of the secondary fixed terminal sending the secondary call signal using at least a part of the call number.

25. The device as claimed in claim 21, the specific processing means being responsive to a telephone call request from the another of the stations to the independent station, the call request being received in the first interface of the first interfaces block, by seeking to establish, in addition to the telephony—station link, the said primary telephony lying between the third primary interface stage of the primary fixed terminal and the first interface of the second interfaces block, on the basis of predetermined supplementary conditions, and on the basis of an information item for localization of the said primary fixed terminal.

26. The device as claimed in claim 21, wherein the first and second interfaces block comprise a plurality of cards for digitization of the telephony signals, linked by at least one link bus forming the interconnection means, the link bus transporting digital data using a frame subdivided into a plurality of time intervals comprising usable intervals and signaling intervals, and the specific processing means acting on at least one of the signaling intervals thereby permitting reception or transmission of a telephone call in or from the first and second interface blocks.

27. The device as claimed in claims 15, wherein the first and second interfaces blocks, the interconnection means and the specific processing means are incorporated in at least one of the connecting units of the network.

28. The device as claimed in claim 27, wherein the second interfaces block comprises a plurality of specialized acoustic interface cards for connection to the primary and secondary fixed terminals by a specialized link, and wherein the first interfaces block comprises a plurality of cards for digitizing the telephony signals, linked together and to the acoustic interface cards by at least one link bus forming the interconnection means.

29. The device as claimed in claim 1, wherein the communications network is a private network.

30. The device as claimed in claim 1, wherein the communications network is a public network.

* * * * *